United States Patent
Lavallee et al.

(10) Patent No.: US 11,281,236 B2
(45) Date of Patent: Mar. 22, 2022

(54) ALTERNATIVE YAW CONTROL

(71) Applicant: Bell Helicopter Textron Inc., Fort Worth, TX (US)

(72) Inventors: Yann Lavallee, St-Hippolyte (CA); Eric Albert Sinusas, Southlake, TX (US); Robert Patrick Wardlaw, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 520 days.

(21) Appl. No.: 16/257,651

(22) Filed: Jan. 25, 2019

(65) Prior Publication Data
US 2020/0241566 A1     Jul. 30, 2020

(51) Int. Cl.
G05D 1/08     (2006.01)
B64C 27/56    (2006.01)
B64C 27/04    (2006.01)

(52) U.S. Cl.
CPC ........... G05D 1/0858 (2013.01); B64C 27/04 (2013.01); B64C 27/56 (2013.01)

(58) Field of Classification Search
CPC ...... G05D 1/0858; B64C 27/56; B64C 27/04; B64C 13/12; B64C 13/044
See application file for complete search history.

(56) References Cited

U.S. PATENT DOCUMENTS

| | | | | | |
|---|---|---|---|---|---|
| 2,442,205 A | * | 5/1948 | Kail | ..................... | G09B 9/28 434/49 |
| 2,516,397 A | * | 7/1950 | Kress | ..................... | B64C 25/48 74/478 |
| 2,517,509 A | * | 8/1950 | Sikorsky | ................... | B64C 1/00 244/17.11 |
| 2,534,353 A | * | 12/1950 | Hiller, Jr. | ................. | B64C 27/43 416/18 |
| 2,584,261 A | * | 2/1952 | Davis | ..................... | G09B 9/16 434/51 |
| 2,599,690 A | * | 6/1952 | Buivid | ..................... | B64C 13/30 416/114 |
| 2,663,371 A | * | 12/1953 | Magill | ..................... | B64C 27/54 416/115 |
| 3,159,360 A | * | 12/1964 | Ryan | .................... | B64C 29/0041 244/7 A |
| 3,181,810 A | * | 5/1965 | Olson | ................. | B64C 29/0033 244/7 R |
| 3,862,800 A | * | 1/1975 | Carr | ..................... | G03B 23/02 353/113 |

(Continued)

FOREIGN PATENT DOCUMENTS

| CA | 2315524 A1 | * | 5/2001 | ............ | B64C 27/28 |
|---|---|---|---|---|---|
| CN | 1224393 A | * | 7/1999 | ......... | B64C 29/0033 |

(Continued)

*Primary Examiner* — Behrang Badii
*Assistant Examiner* — Jalal C Coduroglu
(74) *Attorney, Agent, or Firm* — Lightfoot & Alford PLLC

(57) ABSTRACT

A yaw control system for a rotorcraft featuring a floor mounted pair of pedals configured to measure an up and down motion of a pair of pedals and utilize that up and down motion as a yaw moment control input. The pair of pedals can rock laterally, fore and aft, or vertically. The pair of pedals can be mechanically interconnected to other pairs of pedals or electrically interconnected to duplicate motion across pairs of pedals.

20 Claims, 9 Drawing Sheets

(56) References Cited

U.S. PATENT DOCUMENTS

| | | | | |
|---|---|---|---|---|
| 4,356,786 A | * | 11/1982 | Tuggle | B63C 13/00 114/280 |
| 4,624,425 A | * | 11/1986 | Austin | B64C 31/024 244/13 |
| 4,819,896 A | * | 4/1989 | Narad | B64C 27/56 244/220 |
| 5,056,742 A | * | 10/1991 | Sakurai | B64C 13/044 244/235 |
| 5,304,036 A | * | 4/1994 | Groen | B64C 27/43 244/17.25 |
| 5,415,549 A | * | 5/1995 | Logg | A63F 13/005 434/38 |
| 5,597,138 A | * | 1/1997 | Arlton | A63H 27/12 244/17.13 |
| 5,820,071 A | * | 10/1998 | Cross | B64C 13/341 244/17.13 |
| 6,382,556 B1 | * | 5/2002 | Pham | B64C 27/28 244/6 |
| H2206 H | | 12/2007 | Milgram | B64C 13/507 244/75.1 |
| 7,609,200 B1 | * | 10/2009 | Woodell | G01S 13/953 342/176 |
| 2003/0094537 A1 | * | 5/2003 | Austen-Brown | B64C 29/0033 244/7 R |
| 2007/0067085 A1 | * | 3/2007 | Lu | B60T 8/172 701/70 |
| 2011/0036946 A1 | * | 2/2011 | Depeige | B64F 5/10 244/120 |
| 2015/0225076 A1 | * | 8/2015 | Lawrence | B64C 27/605 415/81 |
| 2016/0229416 A1 | * | 8/2016 | Bambrogan | B23K 31/027 |
| 2018/0251214 A1 | * | 9/2018 | Lavallee | B64D 31/04 |
| 2020/0241566 A1 | * | 7/2020 | Lavallee | B64C 27/04 |

FOREIGN PATENT DOCUMENTS

| | | | | |
|---|---|---|---|---|
| CN | 1873734 A | * | 12/2006 | |
| CN | 104736408 A | * | 6/2015 | B60W 10/20 |
| CN | 104755348 A | * | 7/2015 | B62D 6/00 |
| CN | 106414206 A | * | 2/2017 | F16H 48/22 |
| CN | 107406009 A | * | 11/2017 | B61L 27/0038 |
| DE | 102016125012 A1 | * | 7/2017 | B41F 27/1262 |
| EP | 0875449 A2 | * | 11/1998 | B63B 15/00 |
| EP | 3514052 A1 | * | 7/2019 | B64C 1/1461 |
| KR | 20170031689 A | * | 3/2017 | B60L 13/10 |
| RU | 2652685 C2 | * | 4/2018 | B64C 27/58 |
| WO | WO-2005100154 A1 | * | 10/2005 | B64C 27/72 |
| WO | WO-2009138593 A2 | * | 11/2009 | B64C 1/18 |
| WO | WO-2011138590 A1 | * | 11/2011 | G01L 1/247 |
| WO | WO-2012027777 A1 | * | 3/2012 | B62B 1/14 |
| WO | WO-2017091918 A1 | * | 6/2017 | F16H 61/66259 |

* cited by examiner

ALTERNATIVE YAW CONTROL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Conventional rotorcrafts utilize conventional pedals for controlling yaw. Conventional pedals are elevated from the floor of the rotorcraft and are configured for the user to vary yaw by moving the pedals forward and backward. During crashes elevated pedals promote angled foot position thereby increasing lumbar loading.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure describes a floor-mounted pair of pedals configured for controlling yaw moments of the rotorcraft. The pair of pedals enables a pilot's lower legs to remain generally vertical while varying yaw by making vertical movements with a portion of their feet. The yaw control from the pair of pedals can be unassisted or assisted. For example, unassisted yaw control via the pair of pedals provides the pilot raw yaw control, alternatively assisted yaw control via the pair of pedals provide the pilot side slip delta trim control.

Figure 1:
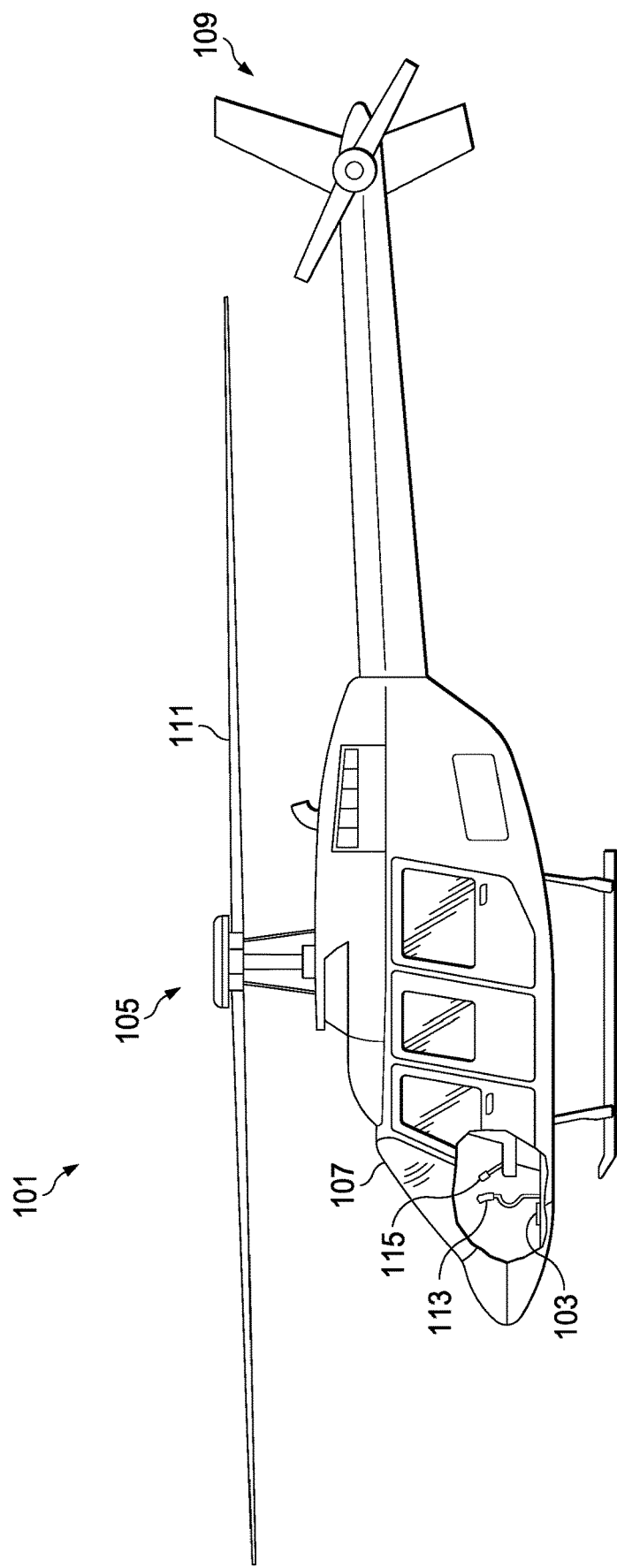
FIG. 1 is a side view of a rotorcraft incorporating a pair of pedals according to this disclosure

FIG. 1 illustrates a rotorcraft 101 equipped with a first pair of pedals 103 according to this disclosure. Other types of aircraft using the first pair of pedals 103 for yaw control are contemplated by this application, such as tiltrotors, fixed wings, convertiplanes, and tiltwings. Rotorcraft 101 comprises a main rotor system 105 carried by a fuselage 107 and a tail rotor system 109 coupled to the fuselage 107. Mainrotor blades 111 operably associated with main rotor system 105 provide lift for rotorcraft 101 and are controlled with a plurality of control sticks within the fuselage 107. For example, during the flight a pilot can manipulate a cyclic stick 113 to cyclically change the pitch angle of main-rotor blades 111, thus providing lateral and longitudinal flight direction, and/or manipulate the first pair of pedals 103 for controlling a yaw moment generated by the tail rotor system 109. Furthermore, the pilot can adjust the collective stick 115 to collectively change the pitch angles of all the mainrotor blades 111. In an alternative embodiment, the pair of pedals are provided for each pilot or co-pilot for different purposes and to take advantage of each of their feet to control various flight parameters. For example, one of the pedals can be used for yaw control and the other pedal used for collective control.

Figure 2:
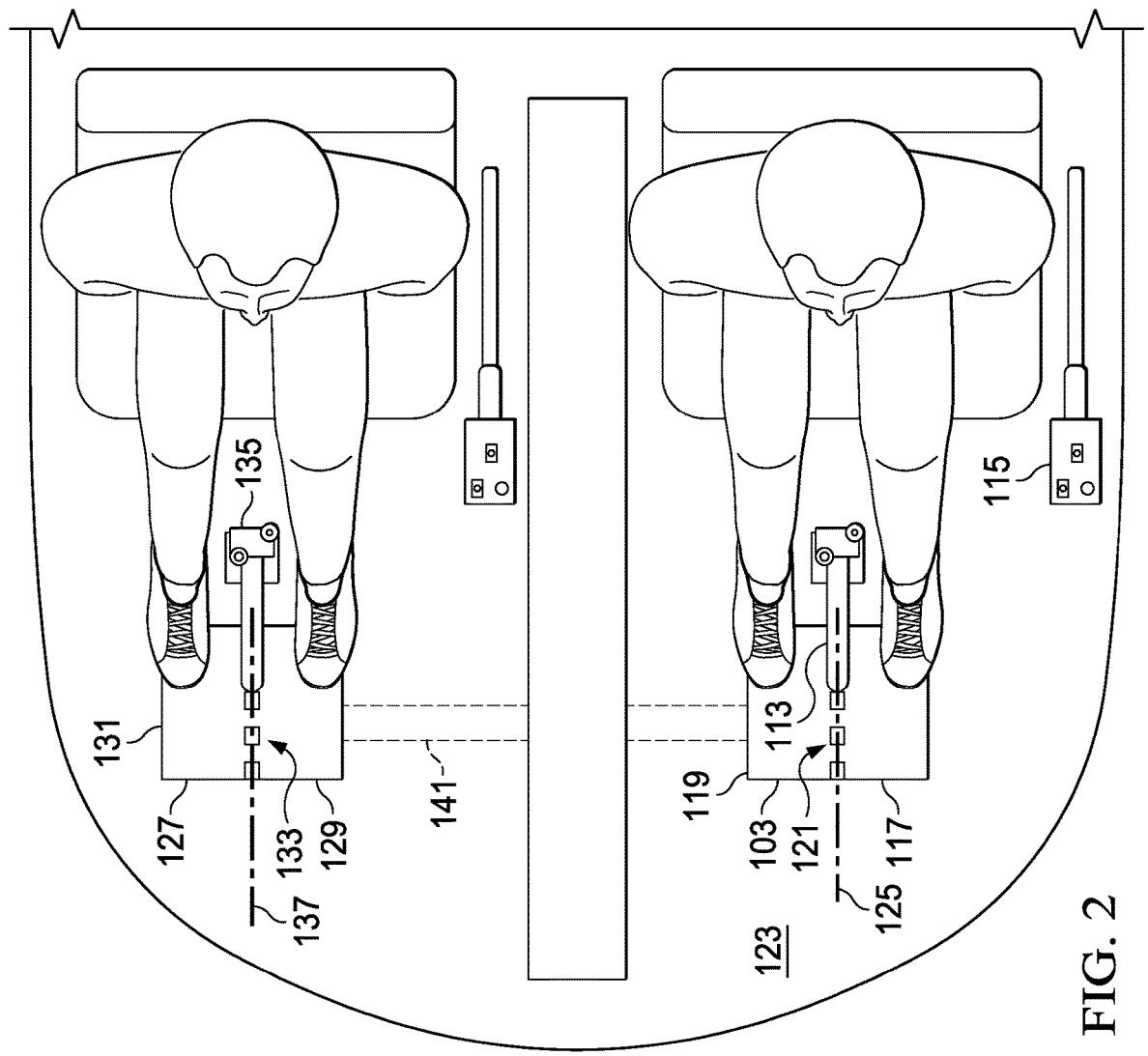
FIG. 2 is a top view of the pair of pedals of FIG. 1.
Figure 3:
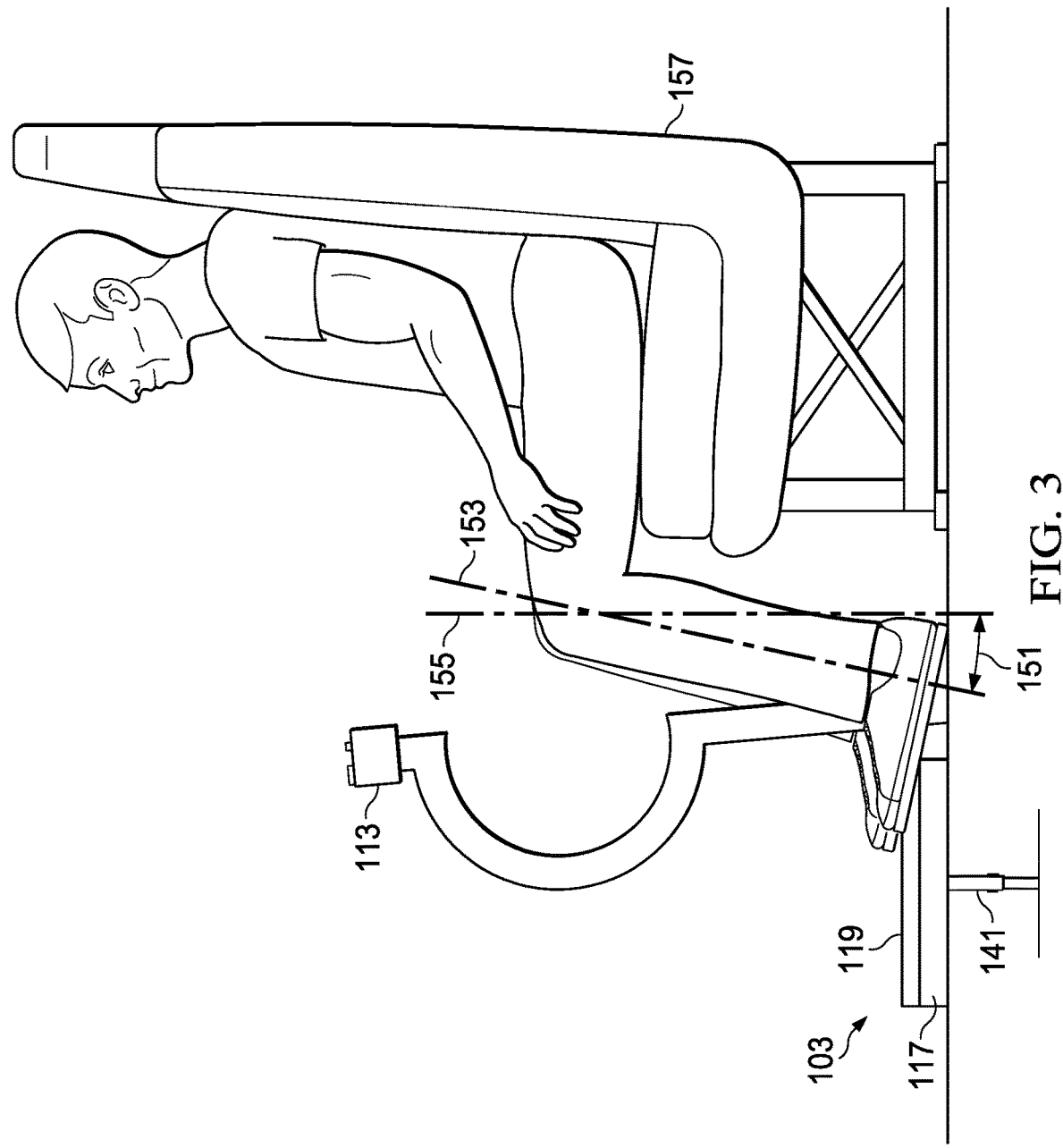
FIG. 3 is a side view of the pair of pedals of FIG. 1.
Figure 4:
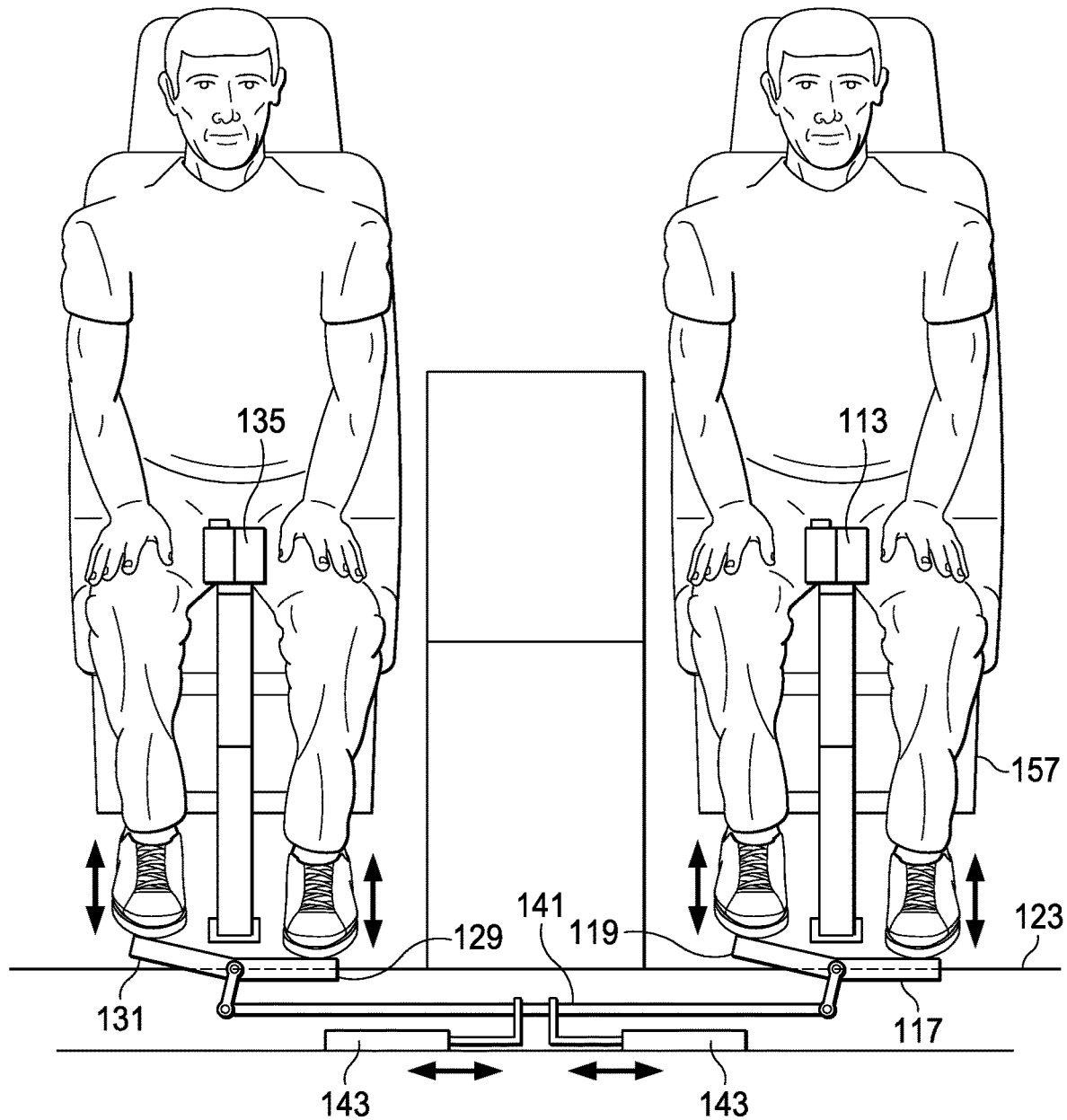
FIG. 4 is a front view of the pair of pedals of FIG. 1.

FIGS. 2 through 4 illustrate the first pair of pedals 103 inside the rotorcraft 101. The first pair of pedals 103 is a rocker, and the first pair of pedals 103 comprises a first pedal 117, a second pedal 119, and a hinged pivot 121 connecting the first pair of pedals 103 to the floor 123. The first pedal 117 is rigidly affixed to the second pedal 119 and preferably features an angle of 135° between the pedals 117, 119. As used herein pedals refer to both separate components coupled to a hinged pivot or areas of a component coupled to a hinged pivot. However, a range of angles between the pedals of 90°-175° is possible. The first pair of pedals 103 is carried by the floor 123 of fuselage 107, is located forward of the cyclic stick 113, and is partially recessed into the floor. The first pair of pedals 103 is configured to pivot about a first axis 125 such that as a user's foot applies a downward force to the first pedal 117 the second pedal 119 applies an upward force to the user and vice versa. Preferably, the first axis 125 is parallel to the floor 123 of the rotorcraft 101, however, canting the first axis 125 is possible. Floor 123 is illustrated as the surface where the pilot's feet rest upon, however other surfaces, such as the subfloor, platforms or other surfaces adjacent to and supporting the pilot's seat, are contemplated by this application.

A second pair of pedals 127 is constructed similarly to pedals 103 and comprises a first pedal 129, a second pedal 131, and a hinged pivot 133 connecting the second pair of pedals 127 to the floor 123. The second pair of pedals 127 is carried by the floor 123 of fuselage 107 and is located forward of a cyclic stick 135. The second pair of pedals 127 is configured as a rocker to pivot about a first axis 137 such that as a user's foot applies a downward force to the first pedal 129 the second pedal 131 applies an upward force to the user and vice versa.

Linkage 141 is located underneath the floor 123 and comprises a plurality of mechanical elements configured to duplicate force between the first pair of pedals 103 and the second pair of pedals 127. For example, as a user applies a downward force to the second pedal 119 of the first pair of pedals 103, the linkage 141 duplicated the downward force on the second pedal 131 of the second pair of pedals 127 to avoid conflicting inputs between pilot and co-pilot. Furthermore, the linkage 141 is connected to sensors 143 designed to measure a displacement of linkage 141. Displacement of linkage 141 as measured by the sensors 143 is utilized by flight control computers to vary yaw of rotorcraft 101. Typically, sensors 143 are LVDTs, but other sensors configured to measure the displacement of linkage 141 are suitable. While linkage 141 is the preferred interconnect between the first pair of pedals 103 and the second pair of pedals 127 using actuators to rotate the pair of pedals is contemplated. For example, an actuator could rotate a portion of the second pair of pedals 127 an amount equal to the co-pilot's input to the first pair of pedals 103 thereby keeping the pedals 103, 127 in unison.

Lower leg angle 151 is defined as an angle between a centerline 153 of the user's lower leg and a vertical line 155. Preferably, the lower leg angle 151 is no larger than 20 degrees to minimize lumbar loading of the pilot during a crash and to provide for substantially vertical forces from the pilot's feet into the pedals during use. The first pair of pedals 103 are located adjacent to each other and located forward of a pilot's seat 157. The pilot can position their feet relative to the pair of pedals 103 for comfort. Additionally, they can translate their seat 157 forward and backward to provide additional adjustment. As shown in FIG. 3, the pilot's lower leg at approximately 11 degrees from vertical is roughly half of a maximum of the lower leg angle 151.

Figure 5:
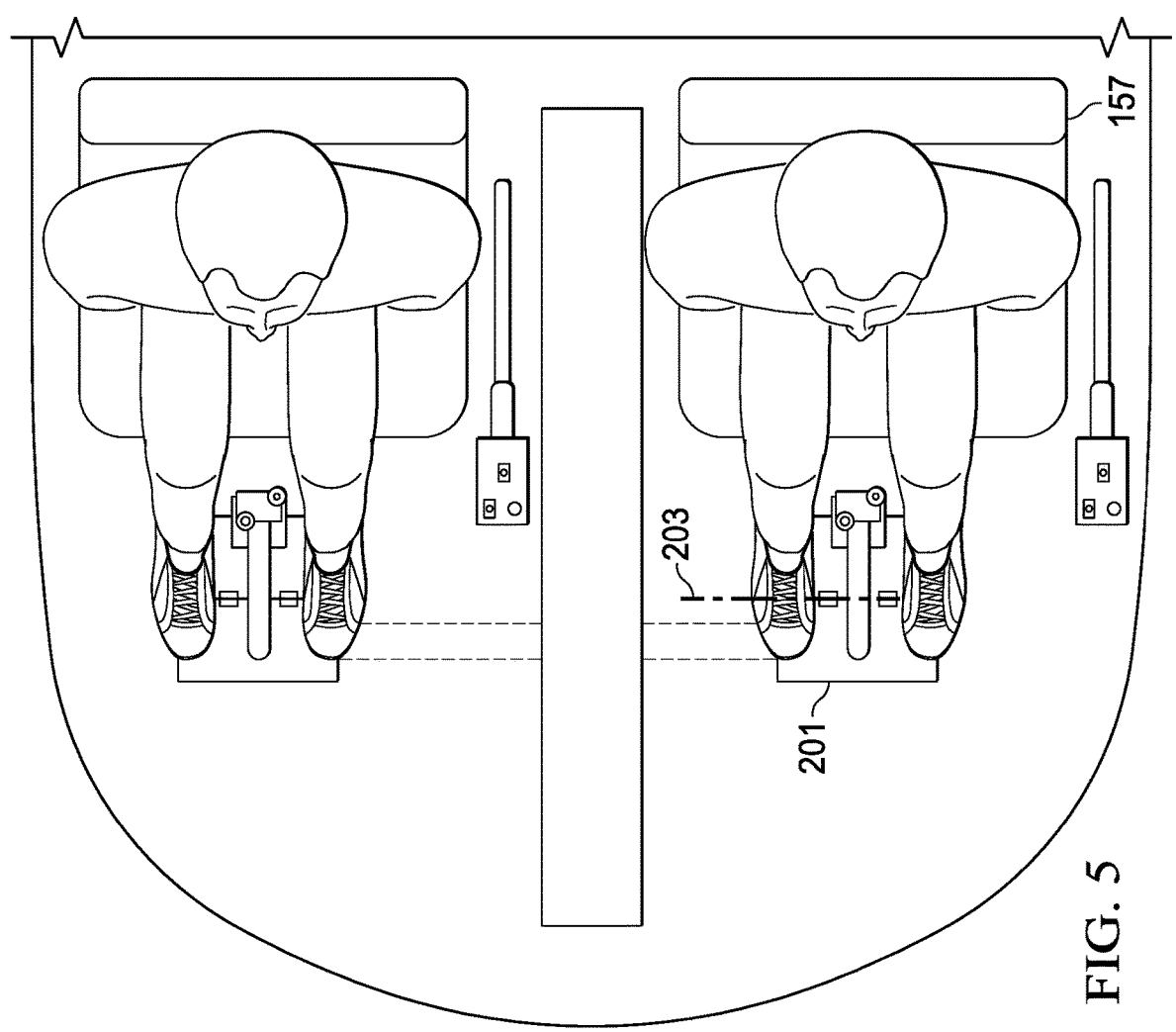
FIG. 5 is a top view of another pair of pedals according to this disclosure.

FIG. 5 illustrates another pair of pedals 201 for the rotorcraft 101 according to this disclosure. Pair of pedals 201 is also a rocker and comprises the same elements as the first pair of pedals 103. However, a first axis 203 is aligned laterally as opposed to the first axis 125 aligned longitudinally. Pair of pedals 201 is configured for fore and aft motion to vary yaw or collective of rotorcraft 101.

Figure 6:
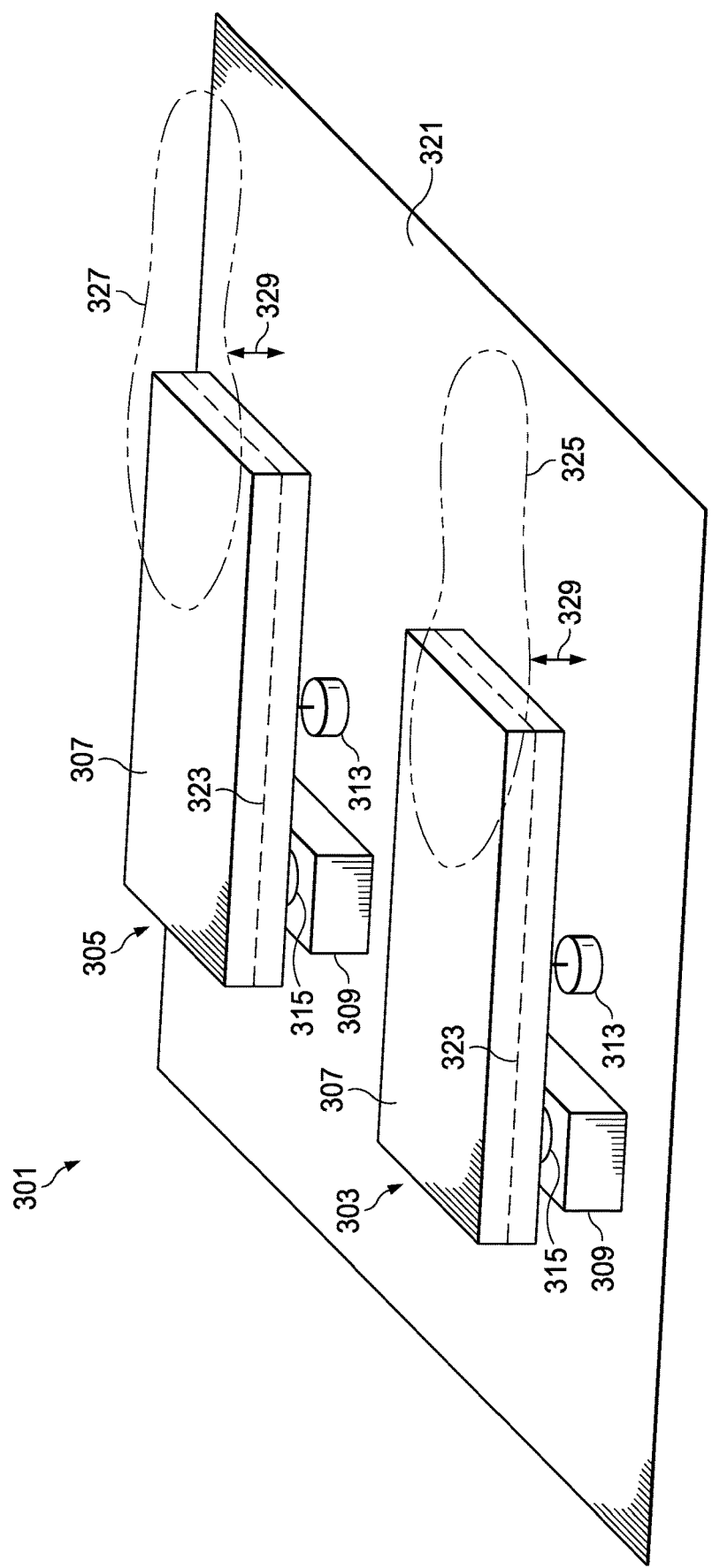
FIG. 6 is an oblique view of another pair of pedals according to this disclosure.

FIG. 6 illustrates another pair of pedals 301 according to this disclosure. Pair of pedals 301 comprises a first pedal assembly 303 and a second pedal assembly 305 located a distance apart from each other. The first pedal assembly 303 and the second pedal assembly 305 are hinged and move up and down as needed to control the yaw of rotorcraft 101. The pilot by depressing the first pedal assembly 303 with a vertical force causes the second pedal assembly 305 to rise an amount equal to the fall of the first pedal assembly 303.

The first pedal assembly 303 and the second pedal assembly 305 comprise a pedal 307, a first member 309, a sensor 313, and actuators 315. Both the first pedal assembly 303 and the second pedal assembly 305 are mounted to a portion of floor 321. Part of the floor 321 is not illustrated to better clarify elements underneath the pedal 307; however, dashed line 323 indicates the height of the unillustrated portion of floor 321 would be illustrated. A left foot outline 325 of a user is illustrated by a dashed line. A right foot outline 327 of a user is illustrated by a dashed line.

The sensor 313 located underneath each pedal 307 measures a vertical displacement 329 of the pedal 307 relative to the floor 321. The vertical displacement 329 of the pedal 307 is transmitted to the actuators 315 of the other pedal assembly to move the other pedal an equal distance but opposite direction. The pilot by depressing the first pedal assembly 303 would cause the second pedal assembly 305 to rise. Alternatively, the pilot by depressing the second pedal assembly 305 would cause the first pedal assembly 303 to rise. Vertical movement of pedals 307 is illustrated by arrows 329.

Figure 7:
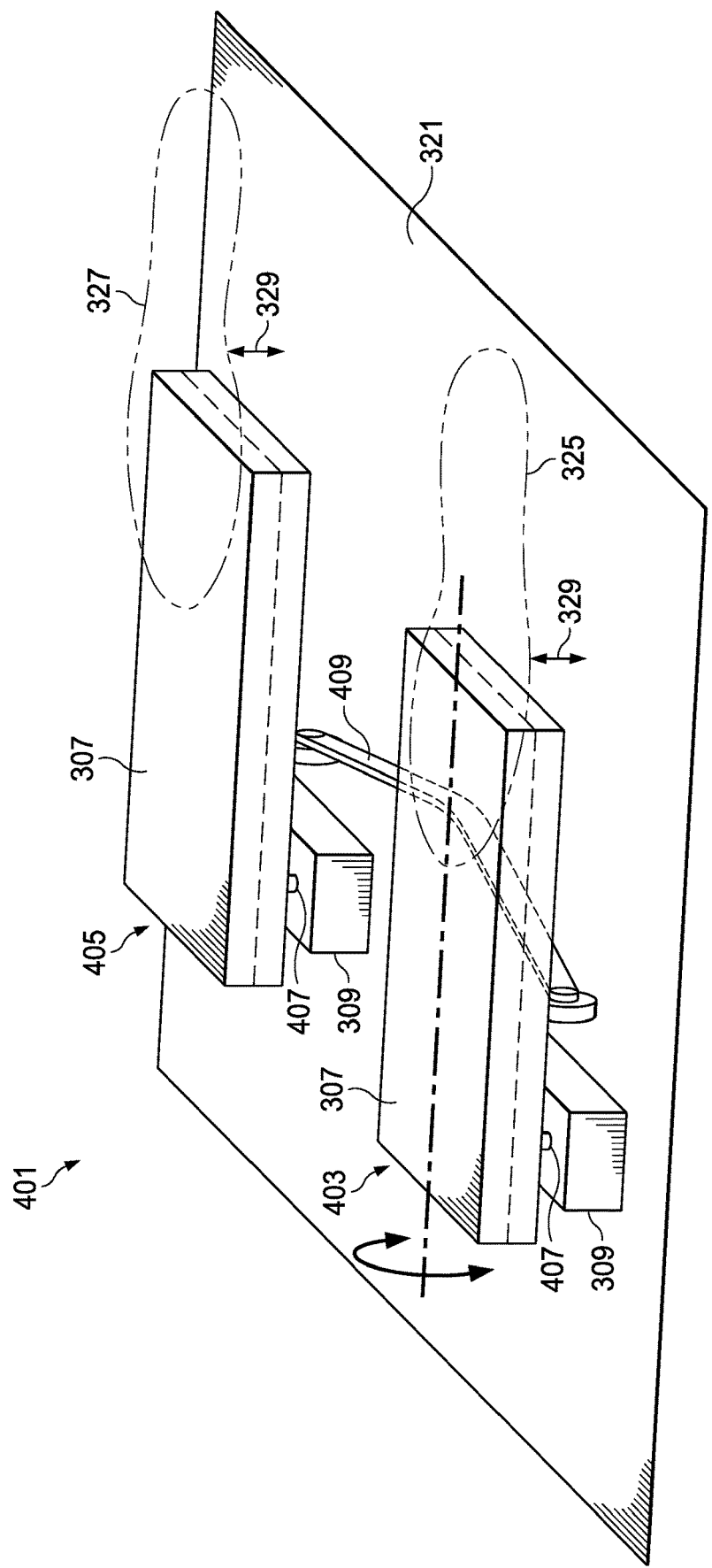
FIG. 7 is an oblique view of another pair of pedals according to this disclosure.

FIG. 7 illustrates another pair of pedals 401 according to this disclosure. Pair of pedals 401 comprises a first pedal assembly 403 and a second pedal assembly 405 located a distance apart from each other. The first pedal assembly 403 and the second pedal assembly 405 moves up and down as needed to control the yaw of rotorcraft 101 in response to the pilot applying a substantially vertical force to one of the pedal assemblies 403, 405. The pilot by depressing the first pedal assembly 403 causes the second pedal assembly 405 to rise an amount equal to the fall of the first pedal assembly 403.

The first pedal assembly 403 and the second pedal assembly 405 comprise a pedal 307, a first member 309, and vertical couplings 407. An interconnect 409 mechanically couples the first pedal assembly 403 to the second pedal assembly 405. Both the first pedal assembly 403 and the second pedal assembly 405 are mounted to a portion of floor 321. Part of the floor 321 is not illustrated to better clarify elements underneath the pedals 307, however, dashed line 323 indicates typically where the unillustrated portion of floor 321 would be located. A left foot outline 325 of a user is illustrated by a dashed line. A right foot outline 327 of a user is illustrated by a dashed line.

The vertical displacement 329 of the pedal 307 of the first pedal assembly 403 is transmitted to the pedal 305 of the second pedal assembly 405 to move the other pedal an equal distance but opposite direction. The pilot by depressing the first pedal assembly 403 would cause the second pedal assembly 405 to rise. Alternatively, the pilot by depressing the second pedal assembly 405 would cause the first pedal assembly 403 to rise.

Figure 8:
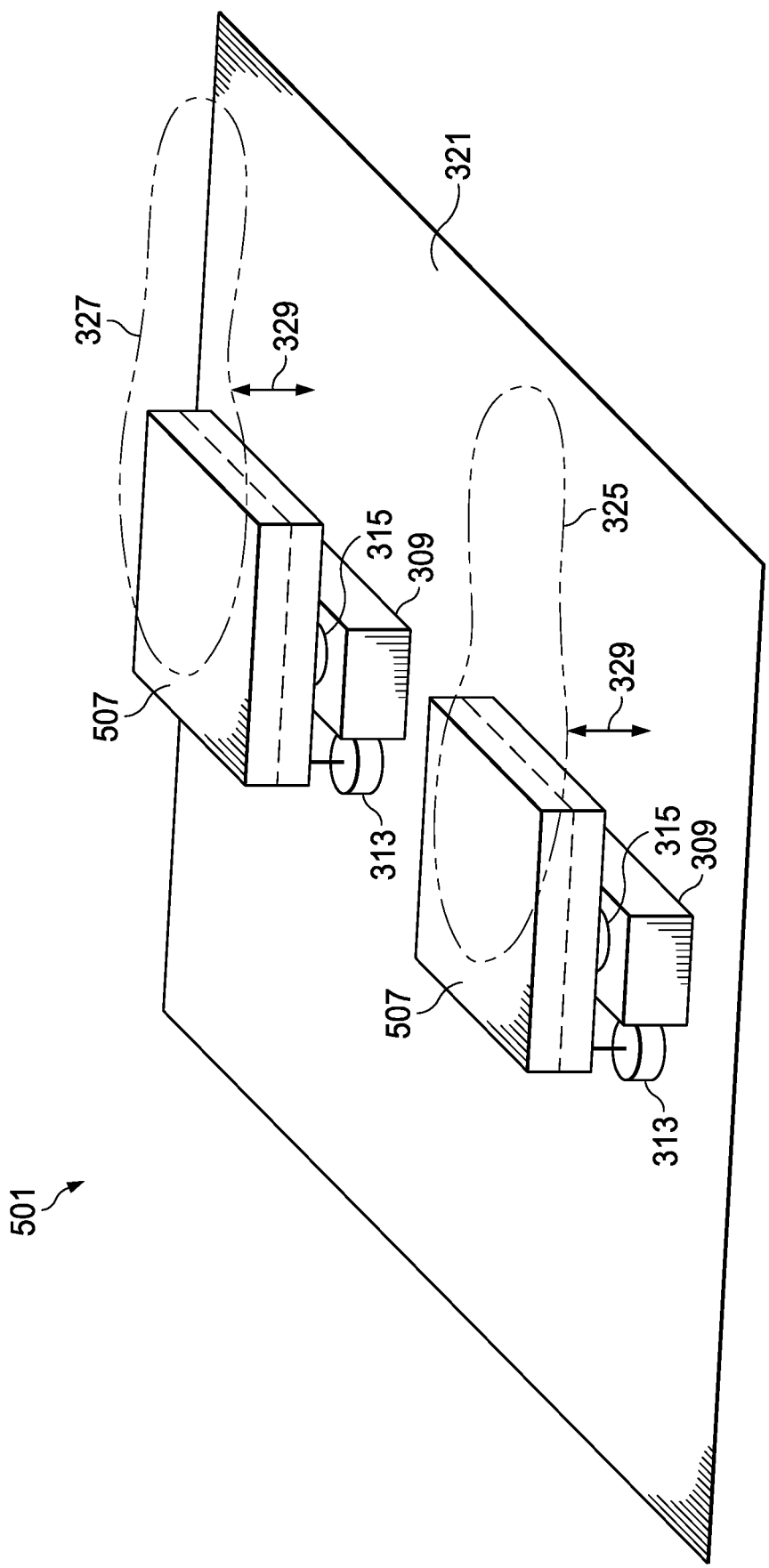
FIG. 8 is an oblique view of another pair of pedals according to this disclosure.

FIG. 8 illustrates another pair of pedals 501 according to this disclosure. Pair of pedals 501 is similar to the pair of pedals 301 but features shorter pedals that are not cantilevered like the pair of pedals 301. Pair of pedals 501 comprises a first pedal assembly 503 and a second pedal assembly 505 located a distance apart from each other. The first pedal assembly 503 and the second pedal assembly 505 moves up and down as needed to control the yaw of rotorcraft 101. The pilot by depressing the first pedal assembly 503 causes the second pedal assembly 505 to rise an amount equal to the fall of the first pedal assembly 303. Another alternative embodiment utilizes a toe clip attached to the foot of the pilot and allows the pilot to raise the pedal by raising their foot which is clipped to the pedal.

The first pedal assembly 503 and the second pedal assembly 505 comprise a pedal 507, a first member 309, a sensor 313, and actuators 315. Both the first pedal assembly 503 and the second pedal assembly 505 are mounted to a portion of floor 321. Part of the floor 321 is not illustrated to better clarify elements underneath the pedal 507, however, dashed line 323 indicates typically where the unillustrated portion of floor 321 would be located. A left foot outline 325 of a user is illustrated by a dashed line. A right foot outline 327 of a user is illustrated by a dashed line.

The sensor 313 located underneath each pedal 507 measures a vertical displacement of the pedal 507 relative to the floor 321. The vertical displacement of the pedal 507 is transmitted to the actuators 315 of the other pedal assembly to move the other pedal an equal distance but inverse direction. The pilot by depressing the first pedal assembly 503 would cause the second pedal assembly 505 to rise. Alternatively, the pilot by depressing the second pedal assembly 505 would cause the first pedal assembly 503 to rise. Vertical movement of pedals 507 is illustrated by arrows 329.

Figure 9:
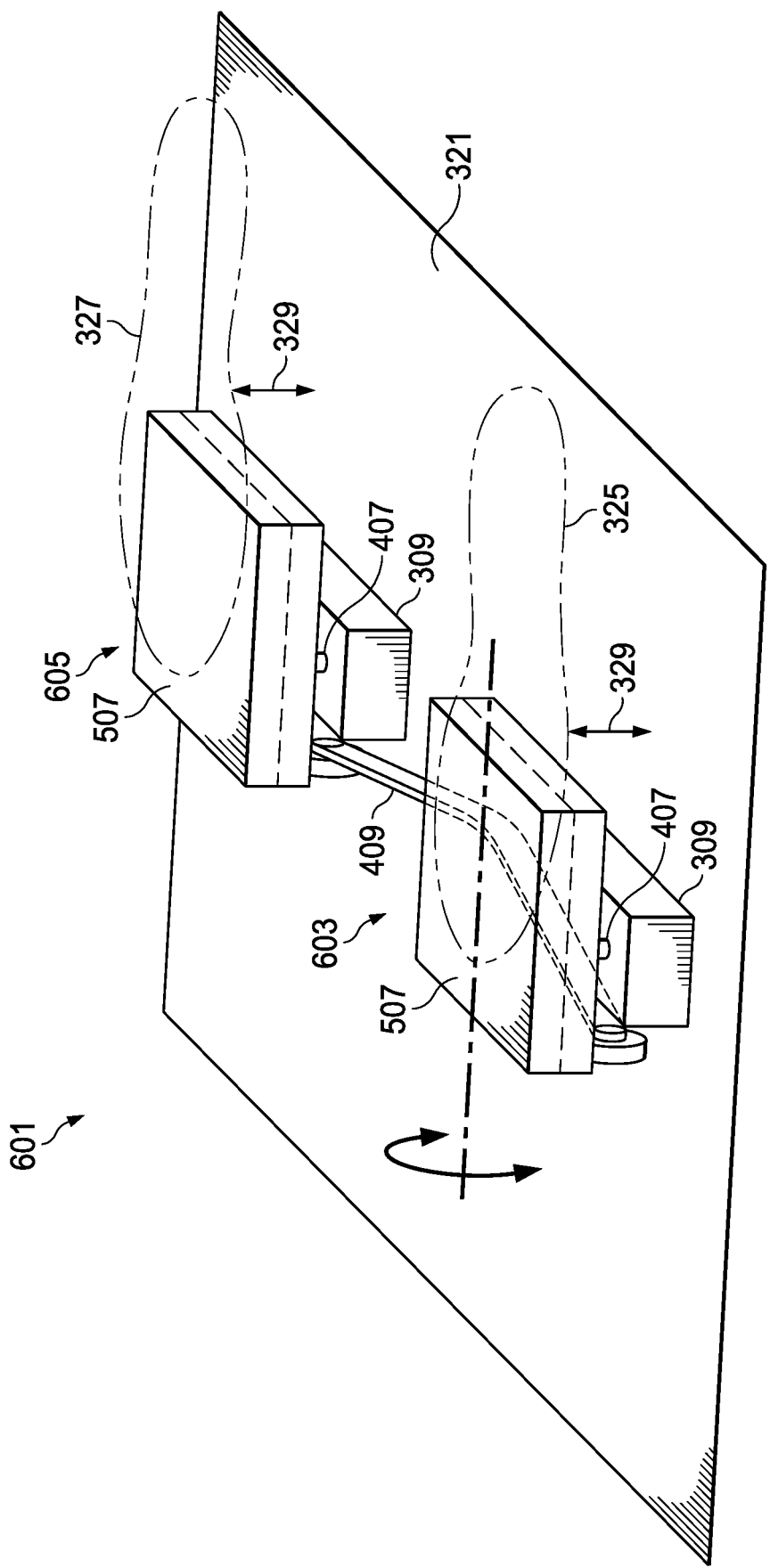
FIG. 9 is an oblique view of another pair of pedals according to this disclosure.

FIG. 9 illustrates another pair of pedals 601 according to this disclosure. Pair of pedals 601 is similar to the pair of pedals 401 but features shorter pedals that are not cantilevered like the pair of pedals 401. Pair of pedals 601 comprises a first pedal assembly 603 and a second pedal assembly 605 located a distance apart from each other. The first pedal assembly 603 and the second pedal assembly 605 moves up and down as needed to control the yaw of rotorcraft 101. The pilot by depressing the first pedal assembly 603 causes the second pedal assembly 605 to rise an amount equal to the fall of the first pedal assembly 603.

The first pedal assembly 603 and the second pedal assembly 605 comprise a pedal 507, a first member 309, and vertical couplings 407. An interconnect 409 mechanically couples the first pedal assembly 603 to the second pedal assembly 605. Both the first pedal assembly 603 and the second pedal assembly 605 are mounted to a portion of floor 321. Part of the floor 321 is not illustrated to better clarify elements underneath the pedals 507, however, dashed line 323 indicates typically where the unillustrated portion of floor 321 would be located. A left foot outline 325 of a user is illustrated by a dashed line. A right foot outline 327 of a user is illustrated by a dashed line.

A vertical displacement 329 of the pedal 507 of the first pedal assembly 603 is transmitted to the pedal 507 of the second pedal assembly 605 to move the other pedal an equal distance but opposite direction. The pilot by depressing the first pedal assembly 603 would cause the second pedal assembly 605 to rise. Alternatively, the pilot by depressing the second pedal assembly 605 would cause the first pedal assembly 603 to rise.

It should be noted that the alternative yaw control system decreases lumbar loading resulting from a crash while simplifying systems and providing better ergonomics to the crew. The alternative yaw control system provides rotorcraft with quicker and more efficient control of yaw during flight, thereby enabling the rotorcraft to be more responsive to the pilot and the flight control system.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A yaw control system for an aircraft, comprising:
a pair of pedals adjacent each other and located forward of a pilot's seat, the pair of pedals being configured to pivot about a first axis parallel to a floor of the aircraft and parallel to a longitudinal axis of the aircraft;
wherein the pedals are configured for displacement in response to substantially vertical forces applied by feet of a pilot with a lower leg angle not larger than 20 degrees from vertical.

2. The yaw control system of claim 1, wherein the pair of pedals is at least partially recessed into a floor of the aircraft.

3. The yaw control system of claim 1, wherein the pair of pedals comprises:
a rocker pivotal about the first axis;
wherein the pair of pedals comprises areas of the rocker located on opposite sides of the first axis.

4. A method of controlling a flight parameter of an aircraft, comprising:
providing a first pair of pedals being configured to pivot about a first axis parallel to a floor of the aircraft and parallel to either a lateral axis of the aircraft or a longitudinal axis of the aircraft;
locating the first pair of pedals adjacent each other and forward of a pilot's seat;
applying a substantially vertical force to at least one of the pedals, the force being applied by a foot of a pilot with a lower leg angle not larger than 20 degrees from vertical; and
controlling a flight parameter on the aircraft based on displacement of the at least one pedal caused by the substantially vertical force.

5. The method of claim 4, wherein the flight parameter is a yaw moment of a tail rotor system.

6. The method of claim 4, wherein the flight parameter is a collective control of a main rotor system.

7. The method of claim 4, further comprising:
providing a second pair of pedals;
locating the pedals of the second pair adjacent each other and forward of a second pilot's seat; and
coupling the pairs of pedals for causing the pairs of pedals to move in unison.

8. The method of claim 7,
wherein coupling the pairs of pedals comprises at least one actuator configured for moving the pairs of pedals in unison.

9. The method of claim 4, wherein the pair of pedals is at least partially recessed into a floor of the aircraft.

10. A yaw control system for an aircraft, comprising:
a pair of pedals adjacent each other and located forward of a pilot's seat, the pair of pedals being configured to pivot about a first axis parallel to a floor of the aircraft and parallel to a lateral axis of the aircraft; and
wherein the pedals are configured for displacement in response to substantially vertical forces applied by feet of a pilot with a lower leg angle of the pilot not larger than 20 degrees from vertical.

11. The yaw control system of claim 10, wherein the pair of pedals is at least partially recessed into a floor of the aircraft.

12. The yaw control system of claim 10, wherein the pair of pedals comprises:
a rocker pivotal about the first axis;

wherein the pair of pedals comprises areas of the rocker located on opposite sides of the first axis.

13. The yaw control system of claim 10, further comprising:
a second pair of pedals adjacent each other and located forward of a second pilot's seat, the second pair of pedals being configured to pivot about a second axis parallel to the floor and parallel to the first axis;
wherein the pedals are configured for displacement in response to substantially vertical forces applied by feet of a pilot with a lower leg angle not larger than 20 degrees from vertical.

14. The yaw control system of claim 13, wherein the second pair of pedals is configured for movement in unison with the other pair of pedals.

15. The yaw control system of claim 14, further comprising:
a linkage coupling the pairs of pedals.

16. The yaw control system of claim 14, further comprising:
at least one actuator configured for moving the pairs of pedals in unison.

17. The yaw control system of claim 1, further comprising:
a second pair of pedals adjacent each other and located forward of a second pilot's seat, the second pair of pedals being configured to pivot about a second axis parallel to the floor and parallel to the first axis;
wherein the pedals are configured for displacement in response to substantially vertical forces applied by feet of a pilot with a lower leg angle not larger than 20 degrees from vertical.

18. The yaw control system of claim 17, wherein the second pair of pedals is configured for movement in unison with the other pair of pedals.

19. The yaw control system of claim 18, further comprising:
a linkage coupling the pairs of pedals.

20. The yaw control system of claim 18, further comprising:
at least one actuator configured for moving the pairs of pedals in unison.

* * * * *